United States Patent
DeForest (10) Patent No.: US 6,327,105 B1
(45) Date of Patent: Dec. 4, 2001

(54) APPARATUS AND METHODS FOR LOW OVERHEAD, HIGHLY RELIABLE DETERMINATION OF POSITION OF A MAGNETIC STORAGE MEDIUM

(75) Inventor: Marvin R. DeForest, Niwot, CO (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/338,098

(22) Filed: Jun. 23, 1999

(51) Int. Cl.⁷ .............................. G11B 5/09; G11B 5/596
(52) U.S. Cl. ........................ 360/49; 360/48; 360/77.08
(58) Field of Search ............................ 360/48, 49, 51, 360/78.14, 40

(56) References Cited

U.S. PATENT DOCUMENTS

| | | | |
|---|---|---|---|
| 5,285,327 | 2/1994 | Hetzler | 360/48 |
| 5,311,376 * | 5/1994 | Joan et al. | 360/51 |
| 5,313,340 | 5/1994 | Takayama et al. | 360/48 |
| 5,796,543 * | 8/1998 | Ton-That | 360/77.08 |
| 5,852,523 * | 12/1998 | Jung | 360/49 |

* cited by examiner

Primary Examiner—Nabil Hindi
Assistant Examiner—Regina Y. Neal
(74) Attorney, Agent, or Firm—Woodcock Washburn LLP (57) ABSTRACT

A highly reliable, low overhead method for determining a position of a magnetic storage medium that is divided into a plurality of servo sections is provided. The inventive method includes defining a predetermined bit pattern that corresponds to a known position of the magnetic storage medium. A positional index bit is associated with each servo section such that a known bit of the predetermined bit pattern is associated with the known position of the magnetic storage medium. A current positional index bit is read from the magnetic storage medium and a positional bit sequence comprising the current positional index bit is formed. The positional bit sequence is compared with the predetermined bit pattern and, based on the comparison, whether the position of the magnetic medium is the known position can be determined.

47 Claims, 4 Drawing Sheets

APPARATUS AND METHODS FOR LOW OVERHEAD, HIGHLY RELIABLE DETERMINATION OF POSITION OF A MAGNETIC STORAGE MEDIUM

FIELD OF THE INVENTION

The present invention relates to magnetic storage media and, more particularly, to apparatus and methods for low overhead, highly reliable determination of the position of such a storage system.

BACKGROUND OF THE INVENTION

Media for recording and reading information are ubiquitous in electronic equipment such as computers, digital cameras, and the like. One type of such media is a flexible data storage disk having a magnetic recording layer disposed over a non-magnetic substrate layer. Examples of these flexible disks include the type commonly referred to as a "floppy disk," a ZIP disk (manufactured by the assignee of the present invention), and the like.

Magnetic disks typically have an "embedded servo," wherein data regions having data and control signal regions having servo information for controlling the position of the magnetic head, are recorded alternately to constitute a recording track. During a process commonly known as "servo-writing," servo information is embedded into the magnetic layer of the magnetic disk. The servo information typically defines substantially concentric, circular tracks. Often, servo information is embedded in a sequence of quadrature servo patterns. Each pattern typically comprises four servo pulses, or bursts, each of which is offset from the neighboring servo burst. Such an embedded servo type disk has an advantage with respect to data recording density, as compared with magnetic disk apparatus in which the track on which the data are recorded and the tracks on which the servo signals are recorded are formed separately on the magnetic disk.

In a conventional embedded servo type magnetic disk apparatus, a read/write control signal, namely the index sector pulse (ISP) signal, is produced in response to the servo information from the control signal of the track, and the read data are transferred to an external unit (e.g. a host computer) in response to the generation of the ISP signal (concerning the "data transfer" operation).

In the conventional magnetic disk apparatus employing embedded servo, one index sector pulse signal functioning as the base point for the read/write control is outputted in response to the servo information which has been read out from the servo (control signal) region of the recorded disk plane. That is to say, in response to signal edges of the servo information $S_n, S_{(n+1)}$ and $S_{(n+2)}$, the index sector pulse signals $ISP_n$, $ISP_{(n+1)}$, and $ISP_{(n+2)}$ are formed. In response to these ISP signals, the read/write controls for the corresponding data $ID_n$, $ID_{(n+1)}, ID_{(n+2)}$ are performed. In other words, a single read/write operation is carried out with respect to a single servo region. This process is described in greater detail in U.S. Pat. No. 5,313,340.

To determine head location relative to a track centerline, a head or transducer measures the signal from each burst. A position error signal ("PES") is determined by comparing the amplitude of the signals read from neighboring bursts. The PES is proportional to the difference between the signal amplitudes of the neighboring bursts, divided by the sum of their signal amplitudes. Thus, the PES represents the offset distance between the head and track centerline as defined by the servo information embedded in the disk. The PES is then used as part of a closed loop servo system to correct the position of the head with respect to the track.

There are known methods for determining the position of a magnetic medium but these methods typically require a relatively significant amount of overhead to be reliable. That is, these methods typically require a relatively high number of bits on the medium dedicated to positional determination. Thus, there is a need in the art for a highly reliable, low overhead method for determining the position of a magnetic storage medium.

SUMMARY OF THE INVENTION

A highly reliable, low overhead method for determining a position of a magnetic storage medium that is divided into a plurality of servo sections includes defining a predetermined bit pattern that corresponds to a known position of the magnetic storage medium. A positional index bit is associated with each servo section such that a known bit of the predetermined bit pattern is associated with the known position of the magnetic storage medium. A current positional index bit is read from the magnetic storage medium and a positional bit sequence comprising the current positional index bit is formed. A shift register is used to form the positional bit sequence by storing a preexisting bit sequence, eliminating the most significant bit of the preexisting bit sequence to form a temporary bit sequence, and appending the current positional index bit to the temporary bit sequence. The positional bit sequence is compared with the predetermined bit pattern and, based on the comparison, whether the position of the magnetic medium is the known position can be determined.

To determine whether the magnetic medium is at one of several known positions, a method according to the present invention includes defining a set of predetermined bit patterns wherein each predetermined bit pattern corresponds to one of the several known positions. The positional index bits are associated with the servo regions such that a known bit of each predetermined bit pattern is associated with the corresponding position of the magnetic storage medium. The positional bit sequence is compared with each predetermined bit pattern within the set and, based on the comparison, whether the position of the magnetic medium is one of the known positions can be determined.

The length of the bit patterns, as well as the patterns themselves are defined based on an allowable number of bit errors. To determine the bit patterns, a distance between bit patterns is calculated based on the allowable number of bit errors. The distance is twice the number of allowable bit errors. The set of predetermined patterns is then determined such that every predetermined bit pattern in the set differs from every other bit pattern in the set by at least the calculated distance. A set of four, nine-bit patterns (001110101, 010110011, 101001101, 101111011) is provided for an application wherein the number of allowable bit errors is two. Note that every bit pattern in the set provided above differs from every other pattern in the set by at least four bits.

A data storage medium according to the present invention has a servo pattern comprising a plurality of servo sections. Each said servo section represents a portion of the magnetic storage medium. A single positional index bit is associated with each said servo section. The servo pattern is written onto the storage medium such that the positional index bits of adjacent servo sections form a predetermined bit pattern that is associated with a known position of the magnetic storage medium.

The data storage medium can then be used in a method as described above for determining whether the magnetic storage medium is at one of a plurality of known positions. First, a current positional index bit is read from the storage medium. A positional bit sequence comprising the current positional index bit is formed from the positional index bits of the adjacent consecutive servo sections. The positional bit sequence is compared with the predetermined bit pattern and, based on the comparison, whether the data storage medium is at a known position can be determined.

BRIEF DESCRIPTION OF THE DRAWINGS

The foregoing and other aspects of the present invention will become apparent from the following detailed description of the invention when considered in conjunction with the accompanying drawings. For the purpose of illustrating the invention, there is shown in the drawings embodiments that are presently preferred, it being understood, however, that the invention is not limited to the specific methods and instrumentalities disclosed. In the drawings.

DESCRIPTION OF THE PREFERRED EMBODIMENT

Figure 1:
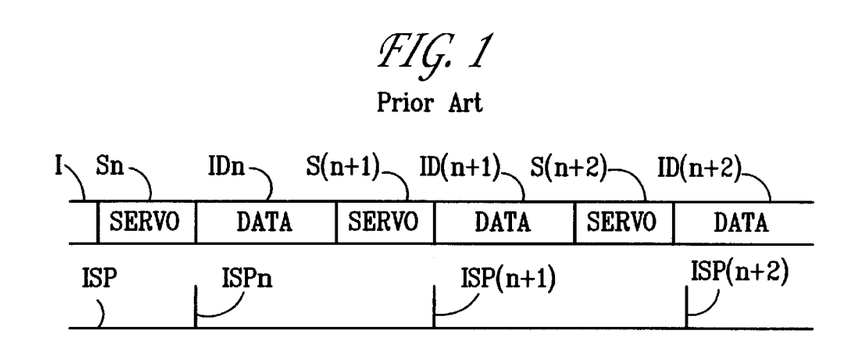
FIG. 1 shows the format of a prior art embedded servo system.

FIG. 1 shows the format of a prior art embedded servo system. FIG. 1 also shows a timing chart representing both a data stream read out from a magnetic disk, and also an index sector signal comprising index sector pulses $ISP_n$, $ISP_{(n+1)}$ and $ISP_{(n+2)}$ that is formed from servo information $S_n$, $S_{(n+1)}$, and $S_{(n+2)}$ included within the data stream.

Figure 2:
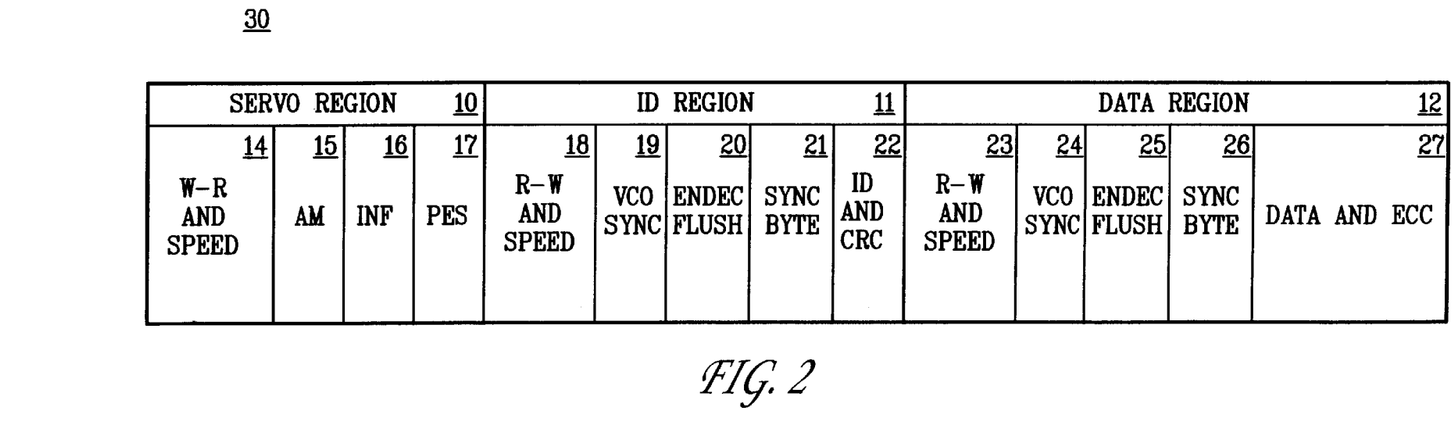
FIG. 2 shows the format of a representative servo section that can be used in accordance with the present invention.

FIG. 2 shows the format of a representative servo section 30 that can be used in accordance with the present invention. As shown, servo section 30 comprises three regions: a servo region 10, an identification (ID) region 11, and a data region 12. Preferably, servo region 10 comprises a write-read (W–R) and speed field 14, an address mark (AM) field 15, a position error signal (PES) field 16, and an information field 17. W–R and speed field 14 allows time for the drive electronics to switch from write to read. AM field 15 is an asynchronous, absolute timing reference that identifies the beginning of the servo region and provides the basis for locating the other fields. PES field 16 includes information used to determine the track position of the recording head. Information field 17 includes information such as cylinder number, index sector indication, etc.

ID region 11 comprises a read-write (R–W) and speed field 18, a VCO synchronization (VCO sync) field 19, an encoder/decoder (ENDEC) flush field 20, a sync byte 21, and an identification (ID) and cyclic redundancy check (CRC) field 22. R–W and speed field 18 allows the time needed to ensure that nothing in servo region 10 is overwritten, and that sufficient time is provided for the write current to rise to its full value. VCO sync field 19 is required to give the variable frequency read clock sufficient time to phase lock to ID and CRC field 22. ENDEC flush field 20 indicates the number of bits the read channel decoder must receive in order to put it into a known state called ENDEC flush. Sync byte 21 indicates the sync byte needed to align the read bytes on current byte boundaries. ID and CRC field 22 includes as the ID portion a sector identifier and bad sector flag and as the CRC portion a cyclic redundancy check for errors in the reading of the ID.

In data region 12, fields 23–26 correspond to fields 18–21, respectively. The function of sync byte field 26, however, is to tell the controller when VCO synch field 24 and ENDEC flush field 25 end and the data, which is contained in data and ECC field 27, begins. Data and ECC field 27 stores the user data together with the error correction code.

A more detailed description of a conventional servo section is provided in U.S. Pat. No. 5,285,327, issued to Hetzler, et al.

According to the present invention, information field 17 in servo region 10 includes a single positional index bit, which is used to determine whether the magnetic medium is in one of several known positions. These known positions are commonly called "positional indexes." As will be described in greater detail below, the methods and apparatus of the present invention require only one bit per servo section to determine whether the magnetic medium is at a positional index. Consequently, these methods significantly reduce the overhead needed to perform this function.

Figure 3:
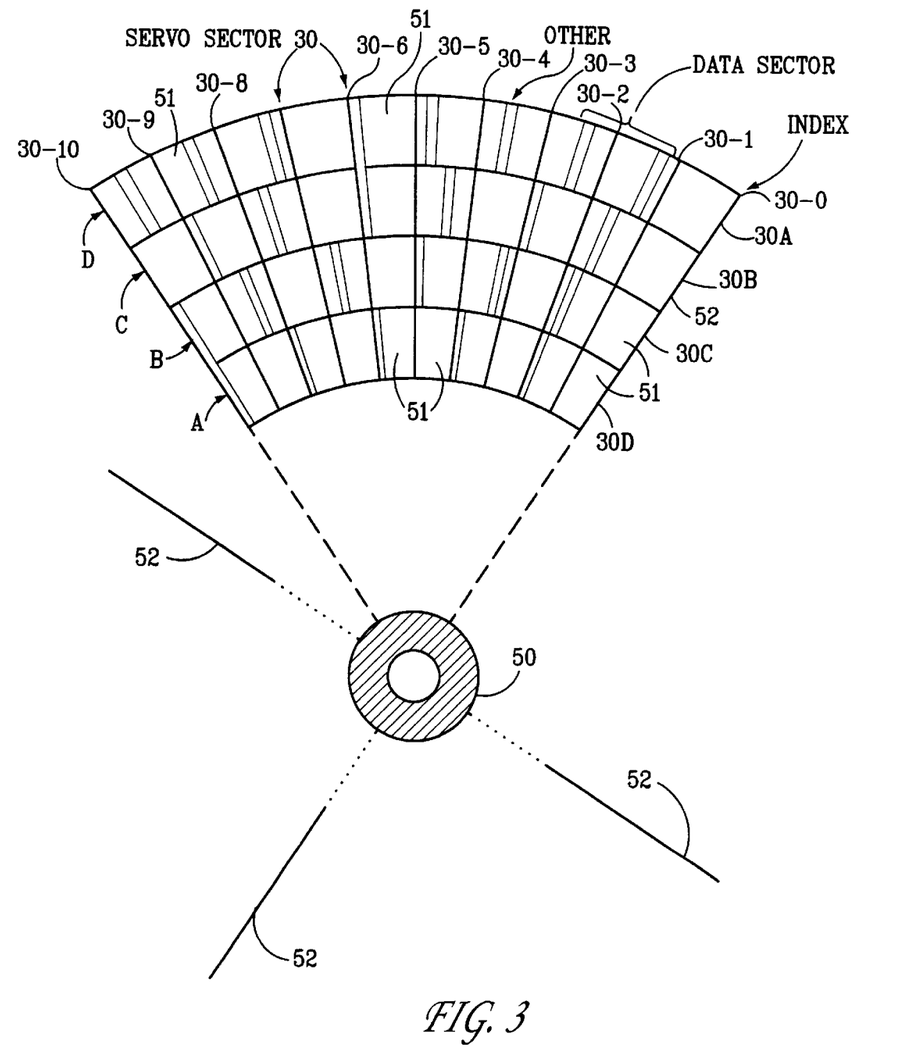
FIG. 3 shows a magnetic storage medium having thereon a servo pattern according to the present invention.

FIG. 3 shows a magnetic storage medium 50 having a servo pattern thereon. As shown in FIG. 3, magnetic medium 50 is a disk, although the present invention can be embodied in other magnetic storage media, such as magnetic tape, for example. Magnetic storage medium 50 is formatted into a plurality of tracks or bands A–D. Although four bands A–D are shown in FIG. 3, magnetic storage medium 50 can be formatted with any number of bands. According to the present invention, the servo pattern on magnetic storage medium 50 comprises a plurality of servo sectors 30 (on a disk, servo sections are more commonly known as servo sectors).

FIG. 3 depicts a disk 50 formatted as banded sectors. Servo sectors 30 in each respective band A–D are written at equally circumferentially spaced intervals and are sampled (i.e., read) during seek, settle, and track following operations. An allowable number of servo sectors per revolution and the lengths of associated data regions 51 on disk 50 is calculated such that each of the equally spaced servo sectors 30 on a given track is located within a data region 51 or immediately after an index mark 52. In a preferred embodiment of the invention, magnetic storage medium 50 is a disk wherein each band A–D is divided into 80 equally sized servo sectors 30. As described above, each servo sector 30 has a servo region 10 comprising an information field 17 that includes a positional index bit (see FIG. 2).

A plurality of index marks 52 are written at preselected, known positions on magnetic storage medium 50. In a preferred embodiment, four index marks 52 are present in each band A–D, although there can be fewer or more. Preferably, the index marks 52 are written at equally circumferentially spaced intervals around the disk 50, and the index marks 52 in each band A–D are at the same rotational position as the corresponding index marks 52 in each of the other bands A–D. Each index mark 52 is associated with a corresponding, predetermined N-bit pattern. For reasons that will be described in greater detail below, the predetermined bit pattern is preferably a nine bit pattern, and is selected from the group consisting of 001110101, 010110011, 101001101, and 101111011. These patterns were selected such that during the positional index search process up to two positional index bits may be in error without a false index position being obtained.

For each index mark 52, a known bit of the corresponding predetermined bit pattern is associated with the index mark 52. That is, the positional index bit in a first servo sector (e.g., the servo sector nearest to the index mark) is set to the value of the known bit. Thereafter, the positional index bits in the servo sectors adjacent to the first servo sector are set to the values of the adjacent bits in the predetermined bit pattern corresponding to the index mark 52.

For example, the positional index bit in the information field of servo sector 30-0, which is nearest to index mark 52, is preferably the least significant bit of the predetermined bit pattern associated with index mark 52. For example, if the predetermined bit pattern associated with index mark 52 is 101111011, then the positional index bit in servo sector 30-0 is a "1." In this way, a known bit of a predetermined bit pattern is associated with a known position of the magnetic medium. The remaining bits of the predetermined bit pattern are associated with the adjacent servo regions from least significant to most significant. That is, for the example given, the positional index bit in the first adjacent servo region 30-1 would be a "1", the positional index bit of the second adjacent servo region 30-2 would be a "0", etc. Accordingly, the positional index bit of the eighth adjacent servo region 30-8 would be a "1." In a preferred embodiment, the remaining positional index bits are set to a value of zero. That is, the positional index bit is a "0" for any servo sector 30 that does not have a bit from one of the patterns associated with it (e.g., servo sectors 30-9 and 30-10).

This pattern is written for the corresponding servo sectors in each of the bands A–D. That is, the positional index bit associated with servo sector 30A is the same as the positional index bit associated with servo sectors 30B, 30C, and 30D. Thus, in each band A–D, the nine bit pattern 101111011 can be used to determine whether the magnetic storage medium 50 is positioned at index mark 52. In this way, a known position of the magnetic medium can be identified regardless of which band is currently being read.

Each of the remaining patterns is distributed about the magnetic medium in the manner described above for the first pattern, with the least significant bit of each pattern written as the positional index bit of the servo region nearest to the corresponding index mark. Thus, in each band, each of the predetermined bit patterns can be used to determine whether the magnetic storage medium is positioned at the index mark that corresponds to that predetermined bit pattern.

Figure 4:
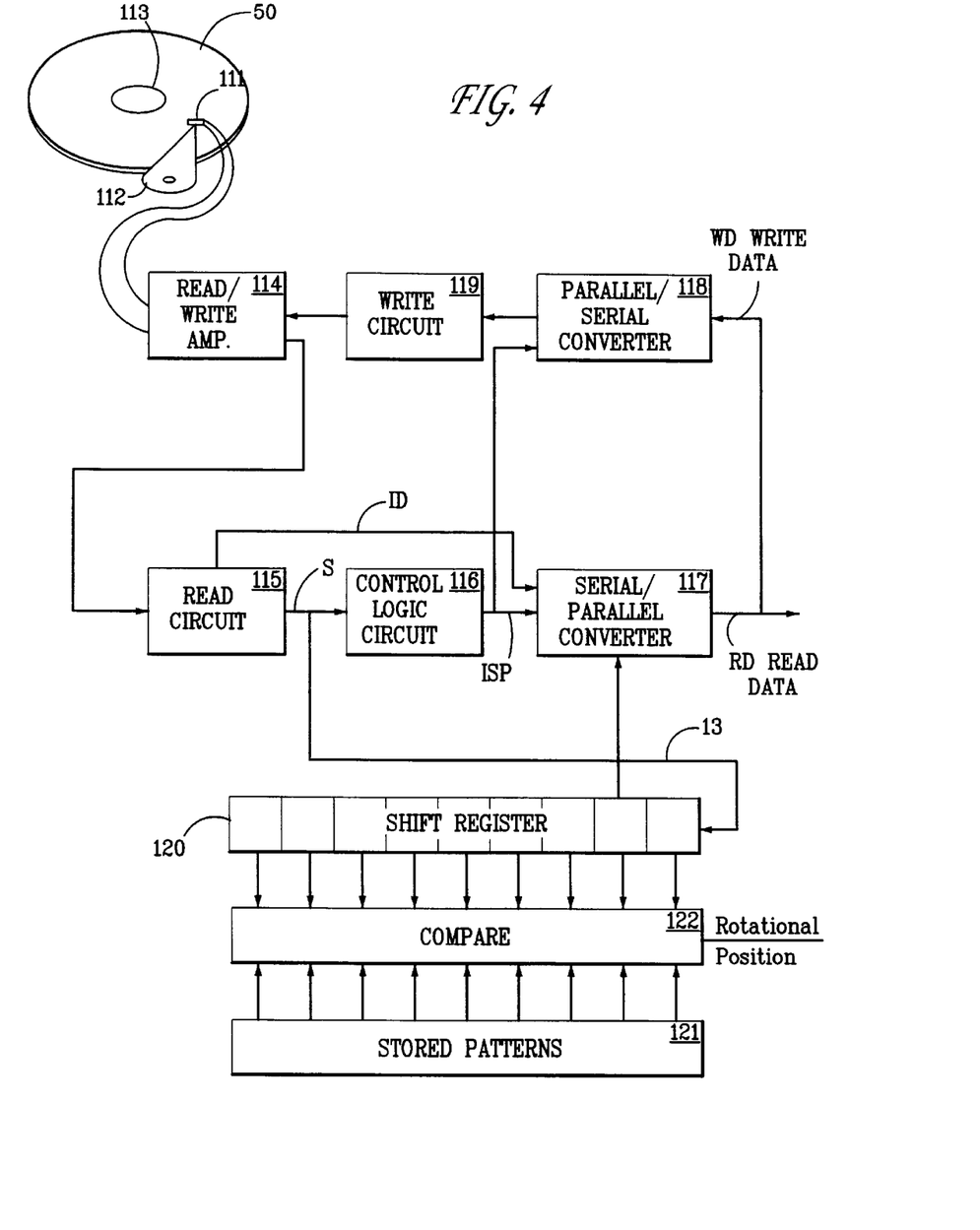
FIG. 4 is a schematic block diagram of a control circuit for performing read and write operations on a magnetic storage medium formatted according to the present invention.

FIG. 4 is a schematic block diagram of a control circuit for performing the read and write operations to determine whether magnetic medium 50 is positioned at one of the known locations, or index marks. Data 113 is read via a head 111 mounted on an arm 112, and is inputted via a read/write amplifier 114 into a read circuit 115. The data inputted into the read circuit 115 is classified, or separated into servo information "S" and real data. The separation between the servo information "S" and the data may be accomplished by employing a known separating circuit. The servo information "S" is inputted into a control logic circuit 116, and further the data is directly inputted into a serial-to-parallel converter 117. The logic control circuit 116 produces the index sector pulse signal ISP functioning as a base point for decoding the data in accordance with the inputted servo information S. The index sector pulse signal ISP is applied to the serial-to-parallel converter 117. The serial/parallel converter 117 decodes the data based on the inputted index sector pulse signal ISP. In an internal circuit of the control logic circuit 116, an index sector pulse signal, ISP, is generated which can be readily produced from the servo information S.

A writing operation of data series will now be explained. Write data "WD" which has been externally inputted, is converted into a serial data series (stream) by way of a parallel-to-serial converter 118 and then the converted write data is inputted onto a write circuit 119. The index sector pulse signals ISP outputted from the control logic circuit 116 are used as a starting point. Since the servo information "S" has been already written into the track of the disk 50 (note that the data ID has not yet been written), the index sector pulse signal ISP is produced based on the readout servo information "S" similar to the read operation. Then, the write data "WD" which has been converted into serial data, is recorded on the magnetic disk 50 via the write circuit 119, a read/write amplifier 114, and the head 111. Accordingly, the data recorded on the magnetic disk 50 is recorded in synchronism with the index sector pulse signal ISP (ISP-A, ISP-B).

In accordance with the present invention, the current positional index bit, i.e., the positional index bit read from the current servo sector 30, is shifted into the least significant bit position of an N-bit shift register 120 to form a positional bit sequence as shown in FIG. 4. The contents of this register are compared with the set of predetermine bit patterns stored in memory 121. If comparator 122 determines that one of the comparisons results in an equal, then it is established that magnetic storage medium 50 is at the known position associated with the predetermined bit pattern that matched the positional bit sequence currently in shift register 120. Once rotational position has been established on the disk, for example, a similar set of operations may be performed to verify that rotational position has not been lost. It should be understood that shift register 120, memory 121, and comparator 122 can be implemented in software, which is currently preferred, or in hardware.

Preferably, the length of the bit patterns, as well as the patterns themselves, can be defined based on the number of allowable bit errors. For example, the nine-bit patterns provided above were selected such that during the positional index search process up to two positional index bits may be in error without a false index position being obtained.

The so-called "distance" between two bit patterns is defined to be the number of bits that would have to change (e.g., via bit errors) in order to make the patterns appear identical. It is known that the distance between patterns should be at least twice the number of allowable bit errors. In this case, for example, where the allowable number of bit errors is two, the distance between bit patterns was defined to be at least four bits. Note that every bit pattern in the set provided above differs from every other pattern in the set by at least four bits.

As discussed above, a preferred embodiment of a magnetic medium according to the present invention includes four index marks and, consequently, four predefined bit patterns. It was determined that, to define a set of four bit patterns wherein each pattern is a distance of four bits from every other pattern, the bit patterns had to be at least nine bits in length.

Figure 5:
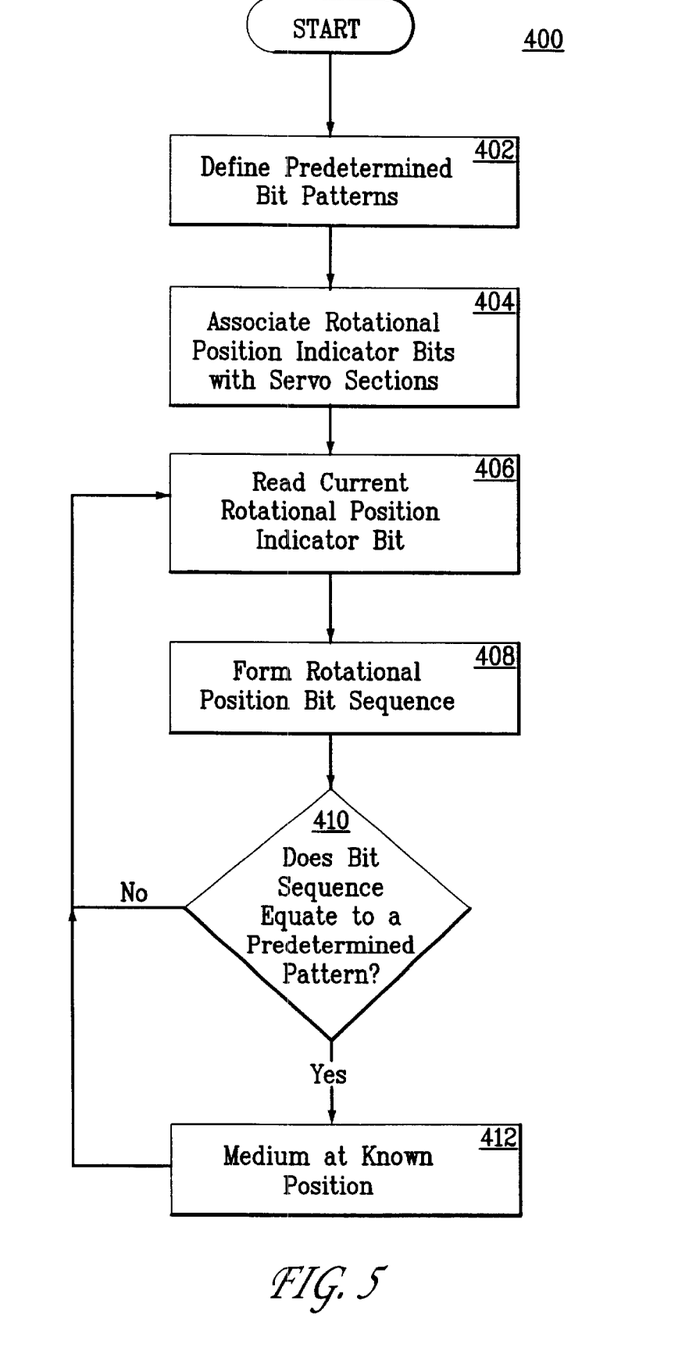
FIG. 5 is a flowchart of a method for determining a position of a magnetic storage medium divided into a plurality of servo sections.

FIG. 5 shows a flowchart of a method 400 according to the present invention for determining a position of a magnetic storage medium divided into a plurality of servo sections.

According to the inventive method, at step 402, a predetermined bit pattern is defined that corresponds to a known position of magnetic storage medium. At step 404, a positional index bit is associated with each servo section such that a known bit of the predetermined bit pattern is associated with the known position of the magnetic storage medium. At step 406, a current positional index bit is read from the magnetic storage medium and, at step 408, a positional bit sequence comprising the current positional index bit is formed. At step 410, the positional bit sequence is compared with the predetermined bit pattern and, at step 412, based on the comparison, it is determined whether the magnetic medium is at known position.

Those skilled in the art will appreciate that numerous changes and modifications may be made to the preferred embodiments of the invention and that such changes and modifications may be made without departing from the spirit of the invention. For example, it should be understood that the number of bit patterns is not limited to four; fewer or more could be used. Similarly, the length of the patterns is not limited to nine bits; again, fewer or more could be used. It is therefore intended that the appended claims cover all such equivalent variations as fall within the true spirit and scope of the invention.

I claim:

1. A method for determining a position of a magnetic storage medium divided into a plurality of servo sections, the method comprising the steps of:

defining a predetermined bit pattern that corresponds to a known position of the magnetic storage medium;

associating a single positional index bit with each said servo section such that a known bit of the predetermined bit pattern is associated with the known position of the magnetic storage medium;

reading a current positional index bit from a first servo section on the magnetic storage medium;

reading a second positional index bit from a second servo section on the magnetic storage medium, the second servo section being adjacent to the first servo section;

forming a positional bit sequence comprising the current positional index bit and the second positional index bit;

comparing the positional bit sequence with the predetermined bit pattern; and based on the comparison, determining whether the position of the magnetic medium is the known position, wherein the positional bit sequence and the predetermined bit pattern each has a length of N bits, where N is defined based on a number of allowable bit errors.

2. The method of claim 1 wherein N is at least nine.

3. The method of claim 2 wherein N is nine.

4. The method of claim 1 wherein the step of forming the positional bit sequence comprises the steps of:

storing a preexisting bit sequence having a most significant bit;

eliminating the most significant bit of the preexisting bit sequence to form a temporary bit sequence; and forming the positional bit sequence by appending the current positional index bit to the temporary bit sequence.

5. The method of claim 4 wherein the step of forming the positional bit sequence is performed via a shift register.

6. The method of claim 1 wherein the predetermined bit pattern is selected from the group consisting of 001110101, 010110011, 101001101, and 101111011.

7. The method of claim 1, further comprising:

defining a set of predetermined bit patterns wherein each predetermined bit pattern within the set corresponds to a unique position of the magnetic storage medium;

associating the positional index bits with the servo sections such that a known bit of each predetermined bit pattern within the set is associated with the corresponding unique position of the magnetic storage medium;

comparing the positional bit sequence with each predetermined bit pattern within the set; and based on the comparison, determining whether the position of the magnetic medium is one of the unique positions.

8. The method of claim 7, wherein defining the set of predetermined bit patterns comprises:

defining an allowable number of bit errors;

calculating a distance between bit patterns based on the allowable number of bit errors; and determining the set of predetermined patterns so that every predetermined bit pattern in the set differs from every other bit pattern in the set by at least the calculated distance.

9. The method of claim 8, wherein the allowable number of bit errors is two.

10. The method of claim 8, wherein the distance is twice the allowable number of bit errors.

11. The method of claim 8, wherein the set of predetermined bit patterns comprises at least one bit pattern selected from the group consisting of 001110101, 010110011, 101001101, and 101111011.

12. The method of claim 8, wherein the set of predetermined bit patterns comprises 001110101, 010110011, 101001101, and 101111011.

13. The method of claim 8, wherein the set of predetermined bit patterns consists of 001111010, 010110011, 101001101, and 101111011.

14. A storage medium having a servo pattern thereon, the servo pattern comprising:

a plurality of servo sections, each said servo section representing a portion of the magnetic storage medium; and a single positional index bit associated with each said servo section, the positional index bits of adjacent servo sections being a predetermined bit pattern associated with a known position of the magnetic storage medium, wherein the predetermined bit pattern has a length of N bits, where N is defined based on a number of allowable bit errors.

15. The storage medium recited in claim 14 in a method for determining a position of the magnetic storage medium, the method comprising the steps of:

reading a current positional index bit from the storage medium;

forming a positional bit sequence comprising the current positional index bit and the positional index bits of the adjacent consecutive servo sections, wherein the positional bit sequence has a length of N bits;

comparing the positional bit sequence with the predetermined bit pattern; and based on the comparison, determining whether the position of the storage medium is a known position.

16. The storage medium recited in claim 14 wherein bit patterns 001110101, 010110011, 101001101, and 101111011 represent four different positions of the storage medium.

17. A method for determining a position of a magnetic storage medium divided into a plurality of servo sections, the method comprising the steps of:

defining a predetermined bit pattern that corresponds to a known position of the magnetic storage medium, wherein the predetermined bit pattern is selected from the group consisting of 001110101, 010110011, 101001101, and 101111011;

associating a single positional index bit with each said servo section such that a known bit of the predetermined bit pattern is associated with the known position of the magnetic storage medium;

reading a current positional index bit from a first servo section on the magnetic storage medium;

reading a second positional index bit from a second servo section on the magnetic storage medium, the second servo section being adjacent to the first servo section;

forming a positional bit sequence comprising the current positional index bit and the second positional index bit;

comparing the positional bit sequence with the predetermined bit pattern; and based on the comparison, determining whether the position of the magnetic medium is the known position.

18. The method of claim 17, wherein the positional bit sequence and the predetermined bit pattern each has a length of N bits, where N is defined based on a number of allowable bit errors.

19. The method of claim 18 wherein N is at least nine.

20. The method of claim 19, wherein N is nine.

21. The method of claim 17, wherein the step of forming the positional bit sequence comprises the steps of:

storing a preexisting bit sequence having a most significant bit;

eliminating the most significant bit of the preexisting bit sequence to form a temporary bit sequence; and forming the positional bit sequence by appending the current positional index bit to the temporary bit sequence.

22. The method of claim 21, wherein the step of forming the positional bit sequence is performed via a shift register.

23. The method of claim 17, further comprising:

defining a set of predetermined bit patterns wherein each predetermined bit pattern within the set corresponds to a unique position of the magnetic storage medium;

associating the positional index bits with the servo sections such that a known bit of each predetermined bit pattern within the set is associated with the corresponding unique position of the magnetic storage medium;

comparing the positional bit sequence with each predetermined bit pattern within the set; and based on the comparison, determining whether the position of the magnetic medium is one of the unique positions.

24. The method of claim 23, wherein defining the set of predetermined bit patterns comprises:

defining an allowable number of bit errors;

calculating a distance between bit patterns based on the allowable number of bit errors; and determining the set of predetermined patterns so that every predetermined bit pattern in the set differs from every other bit pattern in the set by at least the calculated distance.

25. The method of claim 24, wherein the allowable number of bit errors is two.

26. The method of claim 24, wherein the distance is twice the allowable number of bit errors.

27. The method of claim 24, wherein the set of predetermined bit patterns comprises at least one bit pattern selected from the group consisting of 001110101, 010110011, 101001101, and 101111011.

28. The method of claim 24, wherein the set of predetermined bit patterns comprises 001110101, 010110011, 101001101, and 101111011.

29. The method of claim 24, wherein the set of predetermined bit patterns consists of 001110101, 010110011, 101001101, and 101111011.

30. A storage medium having a servo pattern thereon, the servo pattern comprising:

a plurality of servo sections, each said servo section representing a portion of the magnetic storage medium; and a single positional index bit associated with each said servo section, the positional index bits of adjacent servo sections being a predetermined bit pattern associated with a known position of the magnetic storage medium, wherein the predetermined bit pattern is selected from the group consisting of 001110101, 010110011, 101001101, and 101111011.

31. The storage medium recited in claim 30 in a method for determining a position of the magnetic storage medium, the method comprising the steps of:

reading a current positional index bit from the storage medium;

forming a positional bit sequence comprising the current positional index bit and the positional index bits of the adjacent consecutive servo sections;

comparing the positional bit sequence with the predetermined bit pattern; and based on the comparison, determining whether the position of the storage medium is a known position.

32. The storage medium recited in claim 30 wherein bit patterns 001110101, 010110011, 101001101, and 101111011 represent four different positions of the storage medium.

33. A method for determining a position of a magnetic storage medium divided into a plurality of servo sections, the method comprising the steps of:

defining a set of predetermined bit patterns, wherein each predetermined bit pattern within the set corresponds to a unique position of the magnetic storage medium, by defining an allowable number of bit errors, calculating a distance between bit patterns based on the allowable number of bit errors, and determining the set of predetermined patterns so that every predetermined bit pattern in the set differs from every other bit pattern in the set by at least the calculated distance;

associating a respective single positional index bit with each servo section such that a known bit of each predetermined bit pattern within the set is associated with the corresponding unique position of the magnetic storage medium;

reading a current positional index bit from a first servo section on the magnetic storage medium;

reading a second positional index bit from a second servo section on the magnetic storage medium, the second servo section being adjacent to the first servo section;

forming a positional bit sequence comprising the current positional index bit and the second positional index bit;

comparing the positional bit sequence with each predetermined bit pattern within the set; and based on the comparison, determining whether the position of the magnetic medium is one of the unique positions.

34. The method of claim 33, wherein the positional bit sequence and the predetermined bit patterns each has a length of N bits, where N is defined based on the number of allowable bit errors.

35. The method of claim 34, wherein N is at least nine.

36. The method of claim 35, wherein N is nine.

37. The method of claim 33, wherein the step of forming the positional bit sequence comprises the steps of:

storing a preexisting bit sequence having a most significant bit;

eliminating the most significant bit of the preexisting bit sequence to form a temporary bit sequence; and forming the positional bit sequence by appending the current positional index bit to the temporary bit sequence.

38. The method of claim 37, wherein the step of forming the positional bit sequence is performed via a shift register.

39. The method of claim 33, wherein the predetermined bit patterns are selected from the group consisting of 001110101, 010110011, 101001101, and 101111011.

40. The method of claim 33, wherein the allowable number of bit errors is two.

41. The method of claim 33, wherein the distance is twice the allowable number of bit errors.

42. The method of claim 33, wherein the set of predetermined bit patterns comprises at least one bit pattern selected from the group consisting of 001110101, 010110011, 101001101, and 101111011.

43. The method of claim 33, wherein the set of predetermined bit patterns comprises 001110101, 010110011, 101001101, and 101111011.

44. The method of claim 33, wherein the set of predetermined bit patterns consists of 001110101, 010110011, 101001101, and 101111011.

45. A storage medium having a servo pattern thereon, the servo pattern comprising:

a plurality of servo sections, each said servo section representing a portion of the magnetic storage medium; and a respective single positional index bit associated with each said servo section, the positional index bits of adjacent servo sections being one of a set of predetermined bit patterns, wherein each predetermined bit pattern within the set corresponds to a unique position of the magnetic storage medium, and the positional index bits are associated with the servo sections such that a known bit of each predetermined bit pattern within the set is associated with the corresponding unique position of the magnetic storage medium, wherein the set of predetermined bit patterns is defined by defining an allowable number of bit errors, calculating a distance between bit patterns based on the allowable number of bit errors, and determining the set of predetermined patterns so that every predetermined bit pattern in the set differs from every other bit pattern in the set by at least the calculated distance.

46. The storage medium recited in claim 45 in a method for determining a position of the magnetic storage medium, the method comprising the steps of:

reading a current positional index bit from the storage medium;

forming a positional bit sequence comprising the current positional index bit and the positional index bits of the adjacent consecutive servo sections;

comparing the positional bit sequence with each predetermined bit pattern within the set; and based on the comparison, determining whether the position of the magnetic medium is one of the unique positions.

47. The storage medium recited in claim 45 wherein bit patterns 001110101, 010110011, 101001101, and 101111011 represent four different positions of the storage medium.

* * * * *